Patented Aug. 17, 1943

2,326,865

UNITED STATES PATENT OFFICE 2,326,865

ELECTRIC WELDING

Harry E. Kennedy, Berkeley, Calif., assignor to The Linde Air Products Company, a corporation of Ohio No Drawing. Application September 26, 1941, Serial No. 412,436

4 Claims. (Cl. 219—10)

The invention relates to electric welding and constitutes an improvement in the electric welding process described in Patent 2,043,960 issued June 9, 1936, to Lloyd Theodore Jones, Harry Edward Kennedy and Maynard Arthur Rotermund.

In the welding process described in that patent the end of a bare metal electrode is buried in a comminuted mineral-like welding medium or composition which is heaped over the seam to be welded. Metal from the electrode is deposited onto the work through a molten pool of the welding composition by passing an electric current through the electrode and molten pool to the work, the melting end of the electrode and the molten pool of welding composition being buried under a deep blanket of unfused welding composition. The process is fast, efficient, and produces weld deposits of the highest quality.

The composition of the welding medium used in this welding process is of the utmost importance to the successful operation of the process and the full realization of its advantages. Suitable media consisting chiefly of silicates of the alkaline earth or alkali metals are described in Patent 2,043,960, and other suitable media have been developed. To achieve freedom from gas-producing reactions in the welding operation, it is essential that the welding medium be free from gas-forming materials; it is therefore usually the custom to premelt the welding composition to be used, chill it, and then comminute it.

A common property of the media disclosed in Patent 2,043,960, and of all welding media hitherto used in this process, is that although they are conductors of electricity when molten, they are nonconductors when in the solid state or "cold." Because of this, it has hitherto always been necessary to start a welding operation of this type by conducting electric current between the electrode and the work through means other than the solid welding medium. This has most usually been done by inserting a small wad or fuse of steel wool between the electrode and the work and then conducting electric current through the fuse. The fuse is melted, and the heat developed is sufficient to melt a small portion of the welding medium; the melted medium then serves to conduct the current between the electrode and the work.

While the use of a fuse of steel wool to start the welding operation has proved effective, it is sometimes inconvenient, and it is a primary object of this invention to provide an improved means for conducting electric current between the electrode and the work in order to start a welding operation of the type described.

This object is achieved in accordance with the invention by the use of a welding composition to which has been added a metallic, non-oxidic, electrically conductive material in an amount sufficient to make the mixture electrically conductive even when cold. For the purposes of the invention it is necessary to use welding composition mixed with conductive material only at the starting point of a weld, but it may if desired be used for the entire weld without detrimental effects on the quality of metal deposited or on the operation of the process.

The composition of the welding medium has some influence on the composition of the deposited weld metal; therefore the metallic material added to the welding medium should be such that it does not contaminate the deposited metal with undesired impurities and should be chosen with regard to the material to be welded. The use of a finely-divided ferrous material such as iron or steel filings is most satisfactory when welding steel. If copper is to be welded, powdered copper should be added to the composition, and if aluminum is to be welded, powdered aluminum should be used. In general, to achieve the purposes of the invention it is sufficient to add metallic material to the welding medium in an amount about 10% to 20% of the composition by weight.

It is important that the metallic conductive material added to the welding composition be free from oxide. The use of oxidic material would cause gas-producing reactions to take place during the welding operation and would seriously detrimentally affect the welding operation and the quality of the weld produced. Accordingly, the metallic material used should be free from rust or scale.

While the invention has been described with particular reference to the alkaline earth and alkali metal silicate compositions described in Patent 2,043,960, it is equally applicable to use with any welding media suited to the welding process disclosed in that patent which are nonconductors of electricity when cold.

I claim:

1. In an electric welding process in which metal from a bare electrode is melted, deposited on, and coalesced with the metal of a workpiece under a blanket of an unmelted, comminuted, mineral-like welding composition by passing an electric current through said electrode, workpiece, and a molten subsurface pool of said welding composition, in which pool an end of said electrode is buried, said composition being a non-conductor of electricity in the solid state but a conductor when molten, the improved method of starting a weld which comprises inserting between the electrode end and the workpiece an unfused but electrically conductive mixture of comminuted metal and comminuted nonconductive mineral-like welding composition.

2. In an electric welding process in which metal from a bare electrode is melted, deposited on, and coalesced with the metal of a workpiece under a blanket of an unmelted, comminuted, mineral-like welding composition by passing an electric current through said electrode, workpiece, and a molten subsurface pool of said welding composition, in which composition an end of said electrode is buried, said composition being a nonconductor of electricity in the solid state but a conductor when molten, the improved method of starting a weld which comprises inserting between the electrode end and the workpiece an unfused but electrically conductive mixture of comminuted non-conductive mineral-like welding composition and about 10% to 20% comminuted metal.

3. In an electric welding process in which metal from a bare electrode is melted, deposited on, and coalesced with the metal of a workpiece under a blanket of an unmelted, comminuted, mineral-like welding composition by passing an electric current through said electrode, workpiece, and a molten subsurface pool of said welding composition, in which pool an end of said electrode is buried, said composition being a nonconductor of electricity in the solid state but a conductor when molten, the improved method of starting a weld which comprises inserting between the electrode end and the workpiece an unfused but electrically conductive mixture containing about 10% to 20% of comminuted ferrous metal and the remainder comminuted nonconductive mineral-like welding composition.

4. In an electric welding process in which metal from a bare electrode is melted, deposited on, and coalesced with the metal of a workpiece under a blanket of an unmelted comminuted, mineral-like welding composition by passing an electric current through said electrode, workpiece, and a molten subsurface pool of said welding composition, in which pool an end of said electrode is buried, said composition being a non-conductor of electricity in the solid state but a conductor when molten, the improved method of starting a weld which comprises inserting between the electrode end and the workpiece, but only at the starting position of the electrode, an unfused but electrically conductive mixture containing about 10% to 20% of comminuted iron and the remainder comminuted nonconductive mineral-like welding composition.

HARRY E. KENNEDY.